(12) United States Patent
Vigunas (10) Patent No.: US 12,211,400 B2
(45) Date of Patent: Jan. 28, 2025

(54) LABELS WITH ADHESIVE PATCH PATTERNS

(71) Applicant: Iconex LLC, Duluth, GA (US)

(72) Inventor: Mike Vigunas, Duluth, GA (US)

(73) Assignee: Iconex LLC, Duluth, GA (US)

( * ) Notice: Subject to any disclaimer, the term of this patent is extended or adjusted under 35 U.S.C. 154(b) by 0 days.

(21) Appl. No.: 18/343,625

(22) Filed: Jun. 28, 2023

(65) Prior Publication Data

US 2025/0006083 A1     Jan. 2, 2025

(51) Int. Cl.
*G09F 3/00*     (2006.01)
*G09F 3/02*     (2006.01)

(52) U.S. Cl.
CPC .... *G09F 3/0286* (2013.01); *G09F 2003/0229* (2013.01); *G09F 2003/0248* (2013.01)

(58) Field of Classification Search
CPC .. G09F 3/02; G09F 3/0286; G09F 2003/0229; G09F 2003/0248; Y10T 428/14; Y10T 428/28
See application file for complete search history.

(56) References Cited

U.S. PATENT DOCUMENTS

| | | | | |
|---|---|---|---|---|
| 3,741,786 A | * | 6/1973 | Torrey | C09J 7/20 156/719 |
| 5,487,929 A | * | 1/1996 | Rusincovitch, Jr. | D06N 7/0092 428/161 |
| 6,358,587 B1 | * | 3/2002 | Saint | B42F 5/00 428/41.9 |
| 8,537,184 B2 | * | 9/2013 | Roth | H04W 72/0466 347/171 |
| 8,840,984 B1 | * | 9/2014 | Umphlett | B41M 1/40 428/32.11 |
| 9,058,753 B2 | * | 6/2015 | Van Boom | B08B 7/0028 |
| 11,224,043 B1 | * | 1/2022 | Roth | H04W 72/0466 |
| 2008/0113139 A1 | * | 5/2008 | Tokutsu | B42D 5/003 428/40.1 |

(Continued)

FOREIGN PATENT DOCUMENTS

| | | | |
|---|---|---|---|
| EP | 0712722 A1 | * | 5/1996 |
| EP | 2551838 | | 1/2013 |
| WO | 2017075280 | | 5/2017 |

OTHER PUBLICATIONS

"European Application Serial No. 23187686.3, Extended European Search Report mailed Sep. 9, 2024", 7 pgs.

*Primary Examiner* — Patricia L. Nordmeyer
(74) *Attorney, Agent, or Firm* — Schwegman Lundberg & Woessner, P.A.

(57) ABSTRACT

A label is provided. The label includes a substrate with diamond-shaped adhesive patches disposed on a pattern on a backside of the substrate. In an embodiment, the label has a peel value within a range of 130-150 gram force (gf) per inch (gf/in) based on the pattern. In an embodiment, the diamond-shaped adhesive patches include a first diamond-shaped adhesive patch and a second diamond-shaped adhesive patch, the size of the first diamond-shaped adhesive patches is greater than the size of the second diamond-shaped adhesive patch. In an embodiment, each first diamond-shaped adhesive patch surrounds a corresponding second adhesive patch without intersecting or touching the corresponding second adhesive patch.

14 Claims, 4 Drawing Sheets

(56) References Cited

U.S. PATENT DOCUMENTS

| | | | | |
|---|---|---|---|---|
| 2012/0315421 A1* | 12/2012 | Kuo | ............................ | C09J 7/38 |
| | | | | 428/40.1 |
| 2018/0053446 A1* | 2/2018 | Hill | ......................... | B41J 11/703 |
| 2021/0358335 A1* | 11/2021 | Krahl | ....................... | B32B 15/00 |

* cited by examiner

LABELS WITH ADHESIVE PATCH PATTERNS

BACKGROUND

Label usage is pervasive in a variety of industries. A major challenge in manufacturing any adhesive label is tradeoffs between raw material/labor costs and the effectiveness of the label to perform as designed for a given application. Some labels need an adhesive which permits the labels to stick to wet surfaces; some labels need an adhesive which permits the labels to be removed from one surface and reapplied to another surface; and some labels need an adhesive which has a substantial tack to ensure the labels remain adhered to the initial surfaces of which they were applied.

Many factors determine the effectiveness of a label for its given application, such as the substrate of the label, the coatings of the label, the adhesive or mixture of adhesives on the label, the coat weights of the adhesives or mixtures of adhesives on the label, the pattern and coverage areas of the adhesive/mixtures on the label, etc.

SUMMARY

In various embodiments, with adhesive patch patterns are provided. A label includes a substrate, wherein the backside of the substrate includes diamond-shaped adhesive patches arranged in a pattern.

In an embodiment, each diamond-shaped adhesive patch is adjacent to at least two other diamond-shaped adhesive patches. In an embodiment, each diamond-shaped adhesive patch intersects at least two other diamond-shaped adhesive patches. In an embodiment, each diamond-shaped adhesive patch does not intersect any of the remaining diamond-shaped adhesive patches.

In an embodiment, the diamond-shaped adhesive patches include a first diamond-shaped adhesive patch of a first size and a second diamond-shaped adhesive patch of a second size. The first size is greater than the second size. In an embodiment, each first diamond-shaped adhesive patch surrounds a void area that is devoid of any adhesive and the corresponding void area surrounds a corresponding second diamond-shaped adhesive patch.

DETAILED DESCRIPTION

As stated above, the effectiveness of a given label for its intended function is dependent on a variety of factors. Such factors include the coverage of adhesive on the backside of the label, the pattern of adhesive on the backside, and shapes of the adhesive patches within the pattern on the backside.

One measurement for the effectiveness of a label is gram force (GF) per inch (gf/in), which measures the peel force or surface tension required to separate the backside of the label from a surface of an object once the backside is affixed to the surface or the object. Some label applications require strong peel values (i.e., values measured in the gf/in required to separate the label from the surface or the object), such as shipping packages where labels on the packages can be subjected to a variety of temperatures, humidity ranges, rain, snow, and a variety of external forces during shipping.

Unfortunately, use of adhesive is costly during label manufacturing, such that flood coating the backside of the label is generally not preferred. Flood coating is often used with low cost adhesives that are widely available and the adhesives may also have inferior tack properties when compared to adhesives of higher expense and quality.

Peel values of a given adhesive label can be optimized without flood coating by selectively putting the adhesive in specific shapes and/or patterns on the backside of the label. In fact, peel values of a given label can be increased with less adhesive coverage on the backside of the label based on the adhesive patch shape(s) and the pattern(s) of the patches placed on the backside of the label.

Many different adhesive patch shapes and patterns exists in the labeling industry. Each shape and pattern combination is designed to achieve a desired peel value for a given label's intended application while reducing the amount of adhesive and thereby reducing the cost of manufacture.

As described more completely herein, a variety of diamond-shaped adhesive patches are presented and arranged in patterns, which are disposed on the backsides of the labels to increase peel values of the labels while reducing the amount of adhesive needed to manufacture the labels. Additionally, the patterns of the diamond-shaped adhesive patches disposed on the backsides of the labels allow for a consistent and continuous contact with a printer's platen roller as the roller advances the label media through the printer. This occurs with no horizontal gaps or spaces between the diamonds in the pattern and ensures consistent pull and energy exerted by the printer as the label media proceeds through the printer web path. This further allows for consistent wear of the platen roller so that are not area of the laten roller that present differences in the platen roller surface or wear along the entire length and width of the platen roller. Even as the platen roller ages during use, the distribution of pressure created on the platen roller will be equal along the length and circumference of the platen roller. This is a significant improvement in the performance, maintenance, and longevity of the printer, which is achieved because of the patterns of the diamond-shaped adhesive patches disposed on the backsides of the individual labels being fed through the printer as a roll or web of label media.

Figure 1:
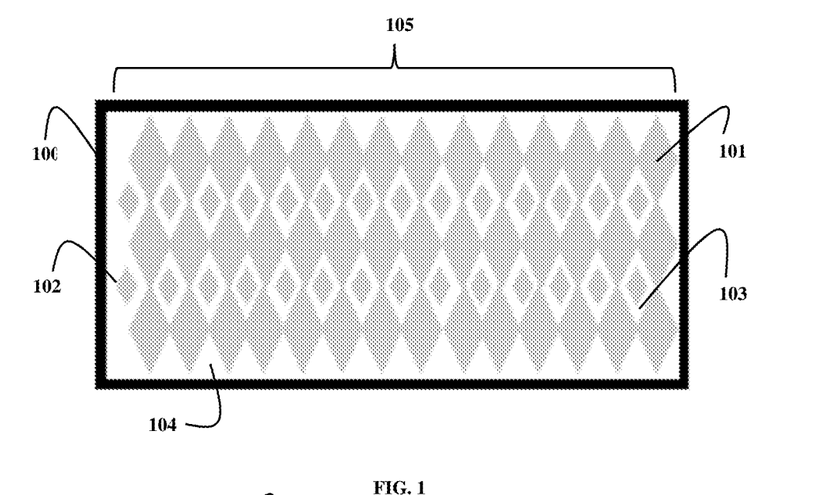
FIG. 1 is a diagram of a backside of an adhesive label with multiple different diamond-shaped adhesive patches arranged in a pattern, according to an example embodiment.

FIG. 1 is a diagram of a backside of an adhesive label 100 with multiple different diamond-shaped adhesive patches 101 and 102 arranged in a pattern 105, according to an example embodiment. The darkened areas depicted in FIG. 1 represent the diamond-shaped adhesive patches 101 and 102. The non-darkened areas depicted in FIG. 1 represent areas devoid of any adhesive or void areas 103 and 104. Void areas 104 are continuous along a periphery of the backside of label 100.

Pattern 105 includes a larger diamond-shaped adhesive patch 101 and a smaller diamond-shaped adhesive patch 102; thus, two different diamond-shaped adhesive patches 101 and 102. Larger diamond-shaped adhesive patches 101 surround or outline the sides of the backside of the label 100 and are included horizontally across a center of the backside. The pattern 105 also includes void areas 103, which form diamond-shaped void areas surrounding or outlining all but two of the smaller diamond-shaped adhesive patches 102. The void areas 103 alternate between and abut the smaller diamond-shaped adhesive patches 102.

The pattern 105 also illustrates that all but two of the smaller diamond-shaped adhesive patches 102 are positioned under at least two larger diamond-shaped adhesive patches 101 and positioned above at least two larger diamond-shaped adhesive patches 101. In the pattern 105, the two leftmost smaller diamond-shaped adhesive patches 102 are positioned adjacent to one side of the backside of the label 100. Each of the two leftmost smaller diamond-shaped adhesive patches 102 are centered and aligned with an intersection of a top leftmost pair of larger diamond-shaped adhesive patches 101 or an intersection of a bottom leftmost pair of larger diamond-shaped adhesive patches 101.

In an embodiment, pattern 105 includes three rows of larger diamond-shaped adhesive patterns 101 each larger diamond-shaped adhesive patch 101 touches and intersects at least two other larger diamond-shaped adhesive patches 101. Each top rightmost or top leftmost larger diamond-shaped adhesive patch 101 intersects and touches an adjacent larger diamond-shaped adhesive patch 101 in the same row and intersects and touches an adjacent larger diamond-shaped adhesive patch 101 in a row below. Each bottom rightmost or bottom leftmost larger diamond-shaped adhesive patch 101 intersects and touches an adjacent larger diamond-shaped adhesive patch 101 in a row above. Each middle rightmost or leftmost larger diamond-shaped adhesive patch 101 intersects or touches a corresponding larger diamond-shaped adhesive patch 101 in a row above, a row below, and in the same row. Two adjacent pairs of the larger diamond-shaped adhesive patch 101 define void area 103 at their intersection points. Within each void area 103, a corresponding smaller diamond-shaped adhesive patch 102 is centered. The smaller diamond-shaped adhesive patches 102 do not intersect nor touch any of adhesive associated with the larger diamond-shaped adhesive patches 101.

Figure 2:
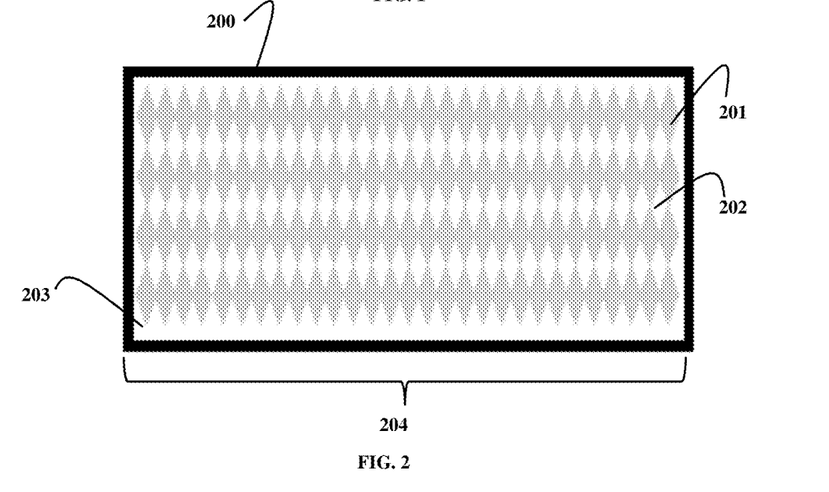
FIG. 2 is a diagram of a backside of an adhesive label with diamond-shaped adhesive patches arranged in a pattern, according to an example embodiment.

FIG. 2 is a diagram of a backside of an adhesive label 200 with diamond-shaped adhesive patches 201 arranged in a pattern 204, according to an example embodiment. Each diamond-shaped adhesive patch 201 represents a same elongated or stretched diamond shape. The density of the elongated diamond-shaped adhesive patches 201 in label 200 is greater from that which was depicted for label 100 above. The pattern 204 includes discontinuous void areas 202 that separate and alternative between and abut the diamond-shaped adhesive patch 201. The pattern 204 further includes additional continuous void areas 203 adjacent to and abutting a periphery of the backside of label 200.

In an embodiment, label 200 includes 4 rows of the elongated diamond-shaped adhesive patches 201 whereas label 100 includes three rows of the larger diamond-shaped adhesive patches 101 and two rows of the smaller elongated diamond-shaped adhesive patches 102.

In the pattern 204, each elongated diamond-shaped adhesive patch 201 intersects or touches at least two other elongated diamond-shaped adhesive patch 201; one intersection with an elongated diamond-shaped adhesive patch 201 in the same row and another intersection with a corresponding elongated diamond-shaped adhesive patch 201 in a row above or a row below. Each of the top, bottom, rightmost, and leftmost elongated diamond-shaped adhesive patches 201 have two intersections with corresponding elongated diamond-shaped adhesive patches 201 in the same row and in row above or a row below. The topmost row of the elongated diamond-shaped adhesive patches 201 in the pattern 204 intersect with adjacent elongated diamond-shaped adhesive patch(es) 201 in the same row and intersect a corresponding elongated diamond-shaped adhesive patch 201 in a row above or a row below. Elongated diamond-shaped adhesive patches 201 surrounded by 4 other elongated diamond-shaped adhesive patches 201 intersect with each of the 4 elongated diamond-shaped adhesive patches.

Figure 3:
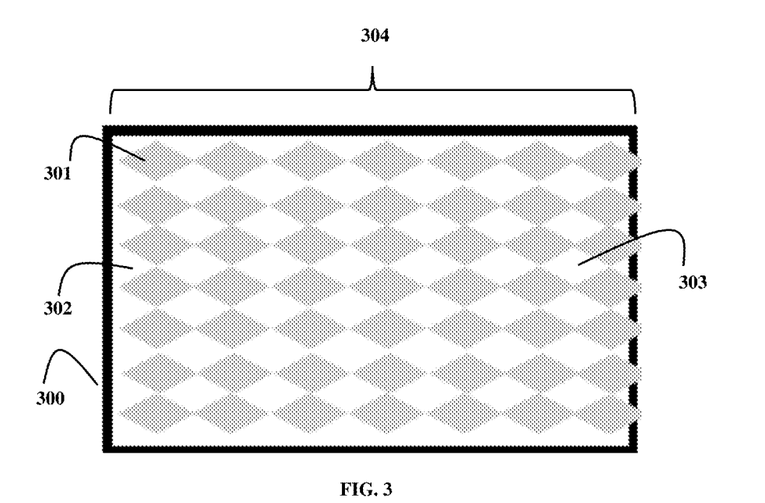
FIG. 3 is a diagram of a backside of an adhesive label with diamond-shaped adhesive patches arranged in a pattern, according to an example embodiment.

FIG. 3 is a diagram of a backside of an adhesive label 300 with diamond-shaped adhesive patches 301 arranged in a pattern 304, according to an example embodiment. In an embodiment, pattern 304 includes 7 rows of diamond-shaped adhesive patches 301. Two adjacent pairs of the diamond-shaped adhesive patches 301 define a void area 303, which is devoid of any adhesive and the void area 303 is diamond shaped. The diamond shapes of the void areas 303 are substantially in a same size and shape as the diamond-shaped adhesive patches 301. Void areas 303 alternate between and abut the diamond-shaped adhesive patches 301.

In an embodiment, void areas 303 are arranged in 6 rows forming a checkered pattern 304 with the diamond-shaped adhesive patches 301. Additional continuous void areas 302 abut or are adjacent to the periphery of label 300.

In the pattern 304, the sides of the backside of the label 300 include additional void areas 302. Adjacent and/or abutting to each void area 302 is one or more rows of the diamond-shaped adhesive patches 301. Void areas 302 are continuous along a periphery of the backside of label 300. Rows of the diamond-shaped adhesive patches 301, which are adjacent to the sides of the backside of label 300, intersect or touch an adjacent diamond-shaped adhesive patch 301 in the same row and intersect or touch an adjacent diamond-shaped adhesive patch 301 in a row above or a row below. Each diamond-shaped adhesive patch 301 that is not adjacent to any side (top, bottom, right, or left) of the backside intersects with two adjacent diamond-shaped adhesive patches 301 in the same row and intersects with both an adjacent diamond-shaped adhesive patch 301 in row above and a row below.

Figure 4:
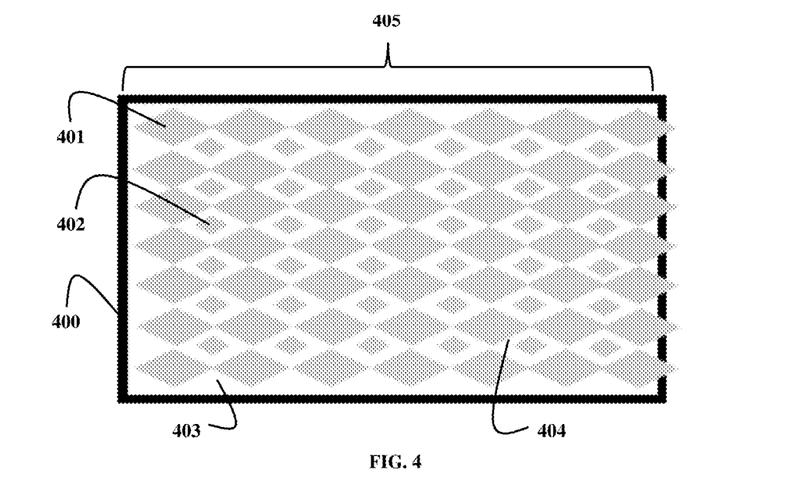
FIG. 4 is a diagram of an adhesive label with multiple different diamond-shaped adhesive patches arranged in a pattern, according to an example embodiment.

FIG. 4 is a diagram of an adhesive label 400 with multiple different diamond-shaped adhesive patches 401 arranged in a pattern 405, according to an example embodiment. The pattern 405 includes diamond-shaped adhesive patches 401 that are flatter and less elongated from that which was shown with label 100. In an embodiment, label 100 included 3 rows of larger diamond-shaped adhesive patches 101 with two rows of smaller diamond-shaped adhesive patches 102 whereas label 400 includes 7 rows of larger diamond-shaped adhesive patches 401 and 6 rows of smaller diamond-shaped adhesive patches 402.

In the pattern 405 of the backside of label 400, void areas 404 are diamond shape and devoid of any adhesive. Within a substantial center of each void area 404 a smaller diamond-shaped adhesive patch 402 is disposed. In an embodiment, the diamond shape of void areas 404 are substantially the same as the larger diamond-shaped adhesive patches 401. In an embodiment, a size of each void area 404 is substantially the same as a size of a corresponding larger diamond-shaped adhesive patch 401 but for the corresponding smaller diamond-shaped adhesive patch 402 aligned in a substantial center of the corresponding void area 404.

Each smaller diamond-shaped adhesive patch 402 does not insect any of the other smaller diamond-shaped adhesive patches 402 nor does the corresponding smaller diamond-shaped adhesive patch 402 intersect or touch any of the larger diamond-shaped adhesive patches 401. Similar to what is shown with label 100 the smaller diamond-shaped adhesive patches 402 are discontinuously disposed on the backside of label 400.

In contrast to pattern 105 of label 100, none of the larger diamond-shaped adhesive patches 401 intersect or touch any other larger diamond-shaped adhesive patch 401 in pattern 405. Thus, the larger diamond-shaped adhesive patches 401 of label are also discontinuously disposed on the backside of label 400.

Along the sides (top, bottom, left, and right) of the backside of label 400 are additional void areas 403. Void areas 403 are continuous along a periphery of the backside of label 400.

In an embodiment, the smaller diamond-shaped adhesive patches 402 are approximately ¼$^{th}$ the size of the larger diamond-shaped adhesive patches 401. In an embodiment, the shapes of both the larger diamond-shaped adhesive patches 401 and the smaller larger diamond-shaped adhesive patches 402 are substantially the same.

Figure 5:
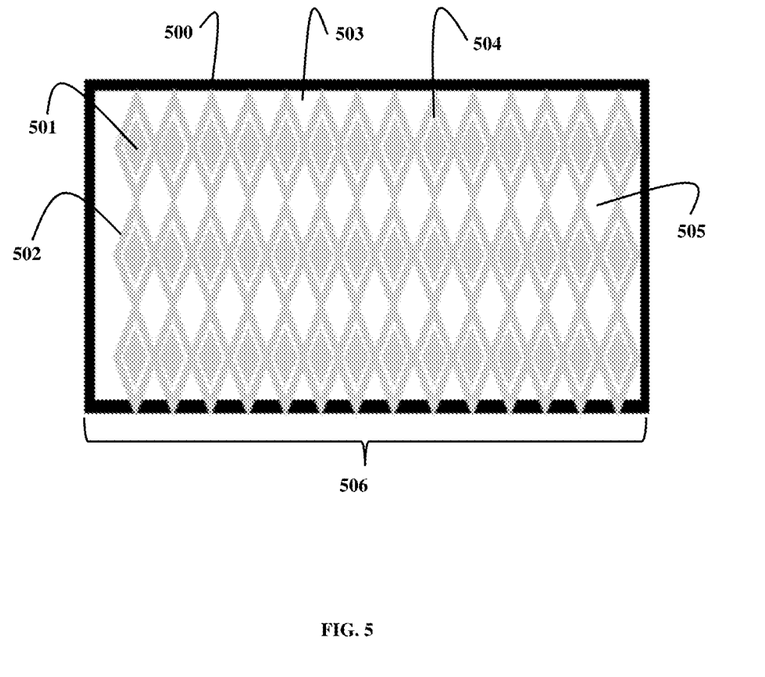
FIG. 5 is a diagram of an adhesive label with multiple different diamond-shaped adhesive patches arranged in a pattern, according to an example embodiment.

FIG. 5 is a diagram of an adhesive label 500 with multiple different diamond-shaped adhesive patches 501 and 502 arranged in a pattern 506, according to an example embodiment. The pattern 506 includes outlined diamond-shaped adhesive patches 502 and inner diamond-shaped adhesive patches 501. Each pair of outlined diamond-shaped adhesive patches 502 and inner diamond-shaped adhesive patches 501 are separated by a void area 504 that is devoid of any adhesive and that is also diamond shaped. In an embodiment, pattern 506 of label 500 includes three rows for the pairs of outlined diamond-shaped adhesive patches 502.

In the pattern 506, each outlined diamond-shaped adhesive patch 502 is adjacent to and intersects or touches at least two other outlined diamond-shaped adhesive patches 502. Each inner diamond-shaped adhesive patch 501 does not intersect with any other inner diamond-shaped adhesive patch 501 nor does the corresponding inner diamond-shaped adhesive patch 501 intersect with any other outlined diamond-shaped adhesive patch 502; thus, the inner diamond-shaped adhesive patches 501 are discontinuously disposed on the backside of label 500.

In the pattern 506, outlined diamond-shaped adhesive patches 502 that are not adjacent to a side (top, bottom, left or right) intersect or touch two adjacent outlined diamond-shaped adhesive patches 502 in the same row, intersect or touch an adjacent outlined diamond-shaped adhesive patch 502 in a row above, and intersect or touch an adjacent outlined diamond-shaped adhesive patch 502 in a row below.

In the pattern 506, additional void areas 503 surround the sides of the backside of the label 500. Void areas 503 separate the sides (top, bottom, left, or right) and corresponding outlined diamond-shaped adhesive patches 502. Void areas 503 are continuous along a periphery of the backside of label 500.

In pattern 506, each second void area 505 is enclosed or encircled by a pair of outlined diamond-shaped adhesive patches 502 situated above the corresponding second void area 505. Moreover, second void area 505 is enclosed or encircled by a pair of outlined diamond-shaped adhesive patches 502 situated below the corresponding second void area 505. Void areas 505 are diamond-shaped.

In an embodiment, the outlined diamond-shaped adhesive patches 502 adjacent to a side of the backside of the label 500 extend to an edge of the corresponding side. In an embodiment, the outlined diamond-shaped adhesive patches 502 adjacent to a side of the backside of the label 500 do not extend to an edge of the corresponding side, which is separated by a corresponding void area 503. In an embodiment, top and bottom rows of the outlined diamond-shaped adhesive patches 502 extend to an edge of the corresponding side of the backside of the label 500 while a leftmost and a rightmost column of the outlined diamond-shaped adhesive patches 502 do not extend to a corresponding edge of the corresponding side, which is separated by a corresponding void area 503. In an embodiment, a leftmost and rightmost column of the outlined diamond-shaped adhesive patches 502 extend to an edge of the corresponding side while top and bottom rows of the outlined diamond-shaped adhesive patches 502 do not extend to a corresponding edge of the corresponding side, which is separated by a corresponding void area.

Figure 6:
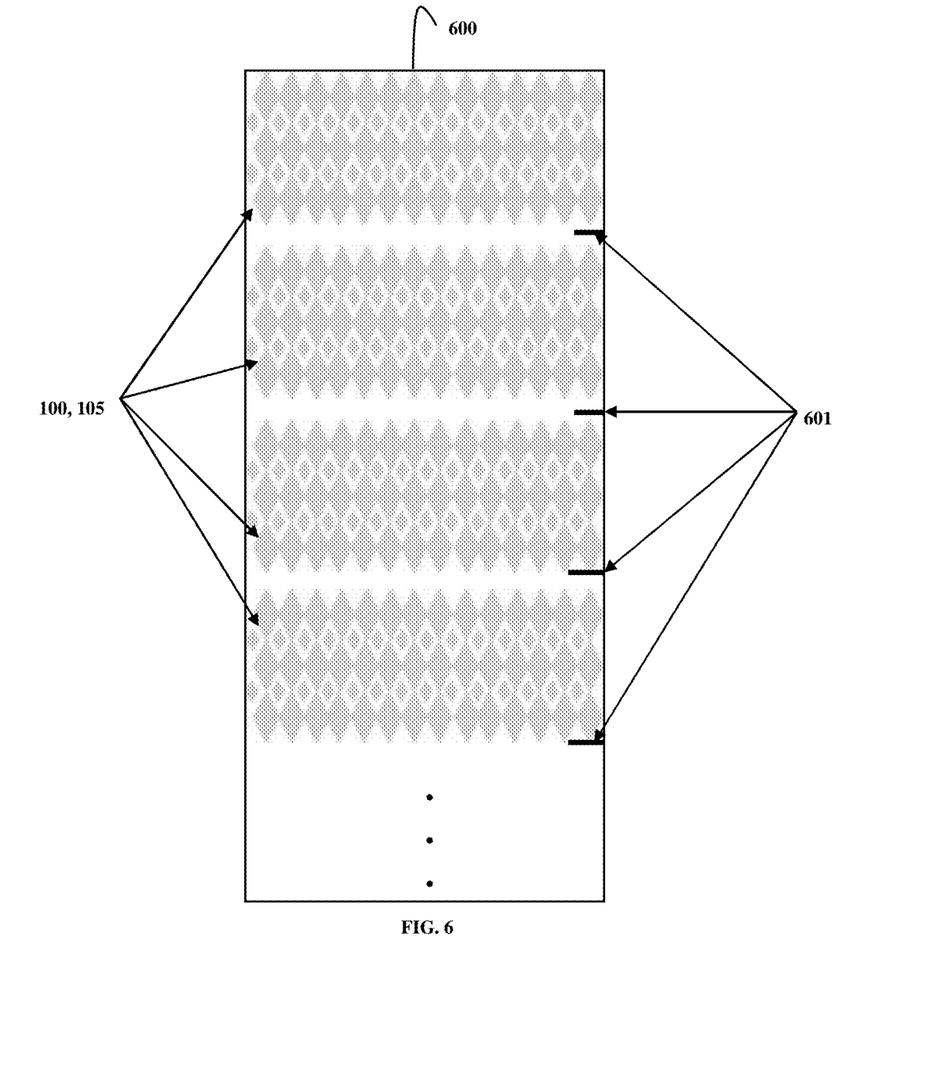
FIG. 6 is a diagram depicting a roll of adhesive labels having multiple different diamond-shaped adhesive patches arranged in a pattern on backsides of the labels, each label separated by a printed sense mark, according to an example embodiment.

FIG. 6 is a diagram depicting a roll of adhesive labels 100 having multiple different diamond-shaped adhesive patches 101 and 102 arranged in a pattern 105 on backsides of the labels 100, each label separated by a printed sense mark 601, according to an example embodiment. It is to be noted that although label 100 with adhesive patch pattern 105 is illustrated in roll 600 this is done for illustration purposes, such that roll 600 can include label 200 with pattern 204, label 300 with pattern 304, label 400 with pattern 405, or label 500 with pattern 506.

Printed sense marks 601 provide an indication to a printer as to where to cut across the web of substrate associated with roll 600 so as to avoid any adhesive when a label 100 is imaged and dispensed from the printer. This avoids adhesive buildup on components of the printer. Each instance of the pattern 105 on the backside of the substrate defines a given label 100 for the roll 600. The sense marks 601 on the backside of the substrate separates each instance of a pattern 105 and provides a location along the web for the printer to cut each label 100 without encountering any adhesive from the adhesive patches 105.

In an embodiment, sense marks 601 are printed along the ends of the top and bottom rows of each label 100, roll 600. In this embodiment, the printer cuts along the tips of two labels to dispense a label 100 from the roll 600. Although adhesive is encountered by the print mechanism of the printer, the amount of adhesive buildup is substantially minimized.

In an embodiment, the peel values associated with the diamond-shaped adhesive patches disposed on the backside of the labels 100, 200, 300, 400, and/or 500 in the corresponding patterns 105, 204, 304, 405, and/or 506 are within the range of 130-150 gf/in.

In an embodiment, the front sides of labels 100, 200, 300, 400, and/or 500 include a thermal-sensitive or thermally-activated image coating on a front side of the label substrate, such that when a thermal printer applies heat to the front side, the front side is imaged with custom indicia.

In an embodiment, the front sides of labels 100, 200, 300, 400, and/or 500 includes a print coating that permits a dot matrix or laser printer to print custom indicia on the front sides.

In an embodiment, the front sides of labels 100, 200, 300, 400, and/or 500 include a release coating disposed over a thermal-sensitive coating or print coating of the front sides to permit the front sides to be wound into roll 600 with the adhesive disposed on the backsides. The roll 600 is then loaded into a printer and unwound by the printer without the front sides adhering to the backsides of the roll. In an embodiment, the release coating is a non-silicon based release coating. In an embodiment, the release coating is a silicon based release coating. In an embodiment when a non-silicon based release coating and the label substrate is a thermally coated or thermal substrate are used, the non-silicon release coating will not cause premature thermal print head wear that results in increasingly poor print image quality and ultimate print head failure.

In an embodiment, the adhesive used in the adhesive patch patterns is specifically engineered adhesive that allows a printer's cutting mechanism to cut through the label substrate cleanly without imparting adhesive debris on the cutting blade. The lack of adhesive debris build up on the cutting blade reduces the likelihood of printer malfunction or media/substrate jamming.

In an embodiment, the diamond-shaped adhesive patch patterns 105, 204, 304, 405, and/or 506 can include a different number of rows (more rows or less rows) from that which was illustrated with labels 100, 200, 300, 400, and/or 500.

In an embodiment, labels 100, 200, 300, 400, and/or 500 are linerless labels without any liner backing for the substrate. In an embodiment, labels 100, 200, 300, 400, and/or 500 include a liner substrate for a liner as a backing to the substrate.

One now appreciates how diamond-shaped adhesive patch patterns 105, 204, 304, 405, and/or 506 disposed on backsides of labels 100, 200, 300, 400, and/or 500 increase peel values over existing labels. This is achieved without flood coating the backsides with an adhesive and therefore reduces expenses associated with manufacturing labels 100, 200, 300, 400, and/or 500.

Although the present invention is described with particular reference to certain preferred embodiments thereof, variations and modifications of the present invention can be affected within the spirit and scope of the following claims.

The invention claimed is:

1. A label, comprising:
a substrate; and
diamond-shaped adhesive patches disposed in a pattern on a backside of the substrate;
wherein the label comprises a peel value within a range of 130-150 gram force (gf) per inch (gf/in) based on the pattern;
where each diamond-shaped adhesive patch is configured to ensure consistent pull and energy exerted by a printer as the label proceeds through a printer web path, thereby allowing for consistent wear or a platen roller of the printer;
wherein the diamond-shaped adhesive patches comprise first diamond-shaped adhesive patches of a first size and second diamond-shaped adhesive patches of a second size, wherein the first size is greater than the second size, and wherein each first diamond-shaped adhesive patch surrounds a corresponding void area, the corresponding void area surrounds a corresponding second diamond-shaped adhesive patch.

2. The label of claim 1, wherein the diamond-shaped adhesive patches include two or more different diamond-shaped adhesive patches.

3. The label of claim 1, wherein the pattern includes void areas devoid of any adhesive that alternate between and abut the diamond-shaped adhesive patches and sides of the backside of the substrate.

4. The label of claim 3, wherein first void areas are diamond shaped, each first void area separates two adjacent pairs of the diamond-shaped adhesive patches.

5. The label of claim 4, wherein the first void areas are discontinuous areas on the backside of the substrate.

6. The label of claim 5, wherein second void areas abut the sides of the backside of the substrate and the second void areas are continuous areas on the backside of the substrate.

7. The label of claim 1, wherein the include void areas, and wherein the void areas comprise first void areas that abut sides of the backside of the substrate and second void areas, wherein each second void area is diamond shaped, discontinuous from other void areas on the backside of the substrate and surrounded by a corresponding first diamond-shaped adhesive patch.

8. The label of claim 1, wherein each first diamond-shaped adhesive patch intersects at least two additional first diamond-shaped adhesive patches within the pattern.

9. The label of claim 1, wherein the diamond-shaped adhesive patches comprise a plurality of a same diamond-shaped adhesive patches arranged in rows and columns within the pattern, and wherein each diamond-shaped adhesive patch intersects at least two additional diamond-shaped adhesive patches.

10. A label, comprising:
a substrate; and
first diamond-shape adhesive patches and second diamond-shaped adhesive patches disposed in a pattern on a backside of the substrate;
wherein the pattern comprises void areas separating the first diamond-shaped adhesive patches from the second diamond-shaped adhesive patches, wherein the void areas on the backside of the substrate are devoid of any adhesive;
wherein the first diamond-shaped adhesive patches are configured to intersect with at least two other first diamond-shaped adhesive patches within the pattern, promoting an even distribution of pressure on a platen roller of a printer;
wherein the first diamond-shaped adhesive patches are larger than the second diamond-shaped adhesive patches, and wherein each first diamond-shaped adhesive patch surrounds a corresponding void area, the corresponding void area surrounds a corresponding second diamond-shaped adhesive patch.

11. The label of claim 10, wherein first void areas of the void areas are diamond shaped.

12. The label of claim 10, wherein each of the first diamond-shaped adhesive patches intersect with at least two other first diamond-shaped adhesive patches, and wherein each of the second diamond-shaped adhesive patches are discontinuously disposed on the backside of the substrate and do not intersect with any first diamond-shaped adhesive patch and any other second diamond-shaped adhesive patch.

13. A roll of labels, comprising:
a web of a substrate; and
diamond-shaped adhesive patches disposed in a pattern on a backside of the substrate, wherein each instance of a pattern on the backside of the substrate defining a label for the roll;
wherein each label comprises a peel value within a range of 130-150 gram force (gf) per inch (gf/in) based on the pattern;

wherein the pattern of the diamond-shaped adhesive patches is configured to minimize adhesive buildup on components of the printer, thereby reducing a likelihood of printer malfunction or substrate jamming;

wherein the diamond-shaped adhesive patches comprise first diamond-shaped adhesive patches of a first size and second diamond-shaped adhesive patches of a second size, wherein the first size is greater than the second size, and wherein each first diamond-shaped adhesive patch surrounds a corresponding void area, the corresponding void area surrounds a corresponding second diamond-shaped adhesive patch.

14. The roll of labels of claim 13 further comprising, sense marks disposed or printed on the backside of the substrate to separate each instance of the pattern and provide a location along the web for a printer to cut each label from the web of the substrate without encountering any adhesive from the adhesive patches.

\* \* \* \* \*